Figure 1:
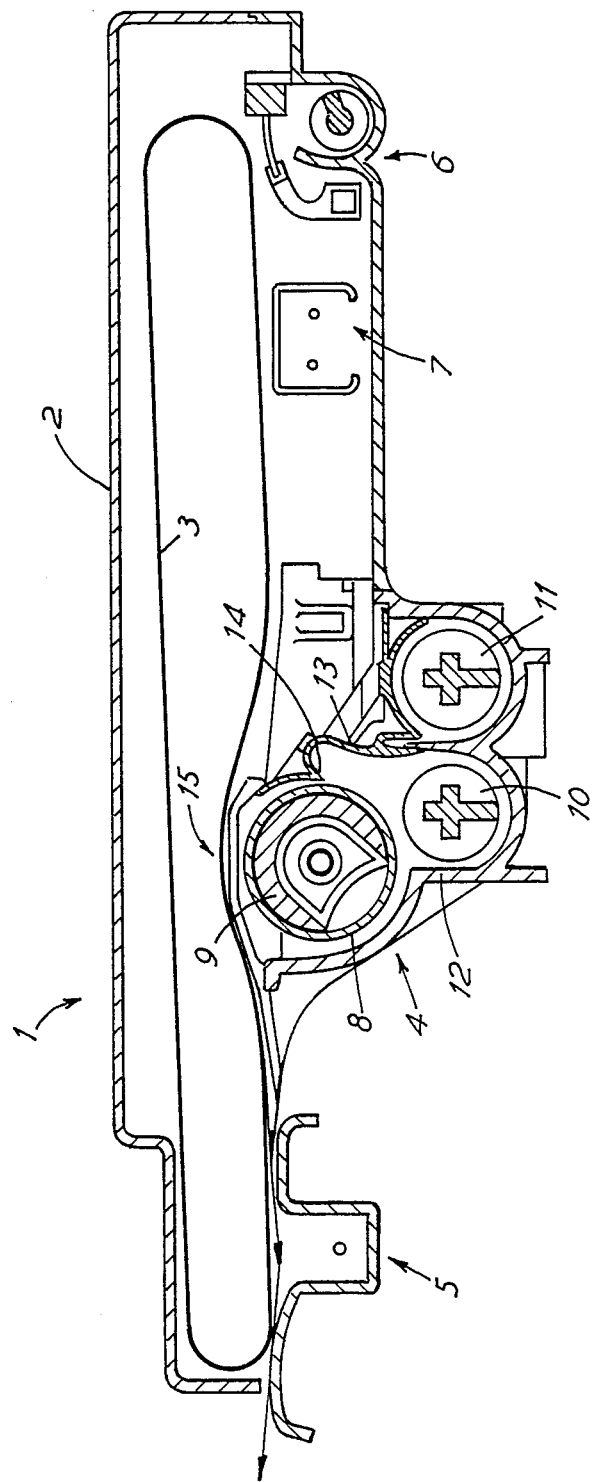

United States Patent [19]

Damji

[11] Patent Number: 4,951,599
[45] Date of Patent: Aug. 28, 1990

[54] BEARING FOR A ROTATABLE MEMBER

[75] Inventor: Dhirendra Damji, Biggleswade, England

[73] Assignee: Xerox Corporation, Stamford, Conn.

[21] Appl. No.: 280,040

[22] Filed: Dec. 5, 1988

[30] Foreign Application Priority Data

Jan. 20, 1988 [GB] United Kingdom ............... 8801226

[51] Int. Cl.[5] ............................................. G03G 15/00
[52] U.S. Cl. ................................... 118/657; 355/200; 355/251; 384/909
[58] Field of Search ................. 174/152 G; 355/251, 355/327, 200, 210, 259; 384/907, 909; 118/656–658

[56] References Cited

U.S. PATENT DOCUMENTS

| | | | |
|---|---|---|---|
| 2,246,086 | 6/1941 | Austin | 384/909 X |
| 2,246,092 | 6/1941 | Gilman | 384/909 X |
| 3,325,172 | 6/1967 | Herbold | 174/152 G |
| 3,841,751 | 10/1974 | Draugelis et al. | 355/327 |
| 3,929,396 | 12/1975 | Ortin et al. | 308/241 |
| 4,113,328 | 7/1978 | Vander Meuler | 308/187 |
| 4,530,609 | 7/1985 | Jasperse et al. | 384/482 |
| 4,806,971 | 2/1989 | Masham | 355/251 |
| 4,816,870 | 3/1989 | Nagayama | 355/251 |

*Primary Examiner*—R. L. Moses

[57] ABSTRACT

Bearing (20) for a rotatable metallic member (8) to which an electrical potential is to be applied during rotation thereof, including a cylindrical sleeve (21) having an internal bearing surface for a cylindrical shaft (17) of said metallic member. The cylindrical sleeve (21) is of a conductive plastic material. The bearing is especially useful in a developer assembly for an electrostatographic apparatus including a metallic developer roll. The developer roll (8) has at least one metallic shaft which is supported for rotation in one of the bearings.

2 Claims, 2 Drawing Sheets

BEARING FOR A ROTATABLE MEMBER

This invention relates to a bearing for a rotatable member, and is especially concerned with such a bearing wherein an electrical potential is to be applied to the rotatable member during rotation thereof. The bearing includes a cylindrical sleeve which has an internal bearing surface for a cylindrical shaft of the rotatable member.

Such a bearing is particularly useful in supporting for rotation the developer roll of a xerographic cassette, that is to say a cassette containing the principal xerographic process elements of a xerographic copying machine. In such a machine, a magnetic brush development system may be used, in which developer material comprising toner particles and carrier beads is brought into contact with an electrostatic latent image. The toner particles adhere electrostatically to the carrier beads, and are attracted to the electrostatic latent image in charged areas of the image. The developer material is brought into contact with the image by the magnetic brush developer roll arrangement, in which non-magnetic roll with a rough outer surface is rotated around a stationary multi-pole magnet. The carrier beads are of a magnetizable material, and form a magnetic brush around the developer roll in well known fashion. The developer roll is typically of aluminium or an aluminium alloy, and is supported for rotation by shafts extending axially from its two ends.

A bias voltage is applied to the developer roll to control the amount of toner that transfers to the photoreceptor. The level of the bias voltage applied is determined during the xerographic set up routine, and can be altered by the operator using the copy contrast buttons on the control panel of the machine. The developer bias voltage performs two functions. It controls the background of the copy, and improves the development of solid areas. Toner only adheres to areas of the photoreceptor with a higher voltage than the bias voltage.

Typically ball bearings are used for the shafts of developer rolls, but this gives rise to the problem that a lubricating grease needs to be used. Furthermore, in order for an electrical potential to be transmitted reliably through the bearing, the grease needs to be a conductive grease. Contamination by toner particles can cause clogging and inefficiency. Also, ball bearings are relatively expensive, especially for use in a cassette which is intended to be discarded at the end of its useful life.

The present invention is intended to overcome these difficulties, and provides a bearing of the kind specified which is characterised in that the cylindrical sleeve which provides the bearing surface is of a conductive plastics material.

According to another aspect of the invention there is provided a developer assembly for an electrostatographic apparatus which includes a metallic developer roll supported for rotation in bearings at least one of which is a bearing in accordance with the invention.

U.S. Pat. No. 4,530,609 describes a bearing assembly in which ball bearings are used to support a rotatable tubular conveyor roll. The inner raceway of the bearing is supported by a graphite-filled, electrically conductive, polymeric hub. The hub, however, does not provide a bearing surface, and is a stationary hub which reduces the transfer of noise to the conveyor chassis. It is made conductive to prevent the build-up of static electricity on the conveyor roller.

Figure 2:
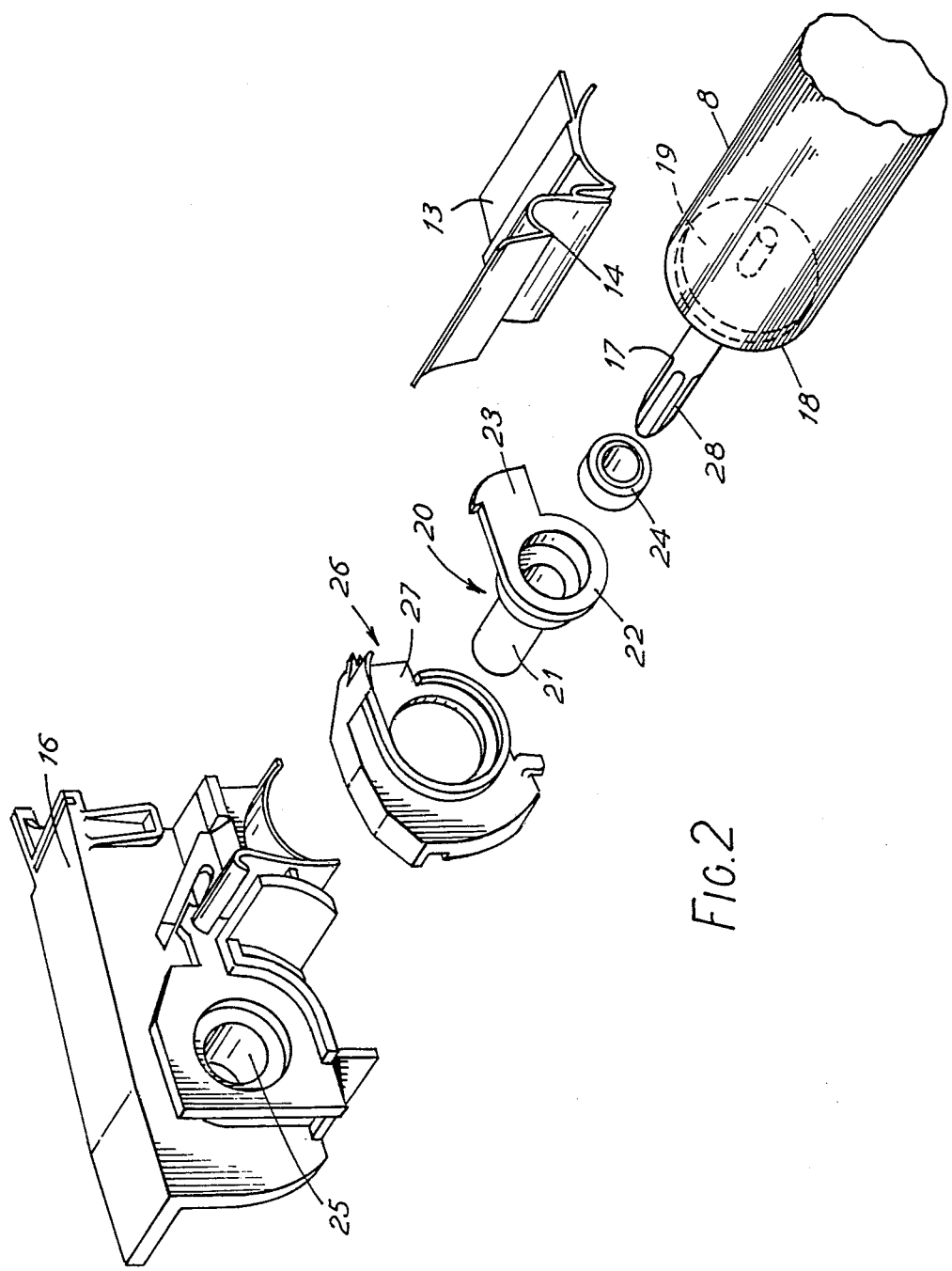

A bearing in accordance with the invention will now be described, by way of example, with reference to the accompanying drawings, in which:

FIG. 1 is a simplified cross sectional view of a xerographic cassette, having a developer assembly which includes a bearing in accordance with the invention, and FIG. 2 is an exploded perspective view of part of the developer assembly of the xerographic cassette of FIG. 1, showing the bearing of the invention.

Referring to FIG. 1, there is shown a xerographic cassette which is designed to be removably mounted in the main assembly of a xerographic copier. The cassette 1 comprises a housing 2, made for example primarily of polystyrene, which encloses an imaging member in the form of a belt photoreceptor 3 in addition to various processing members, in particular a development device 4, a transfer corotron 5, a cleaner 6, and a charge corotron 7. Apart from the development device 4, these processing members are not directly relevant to the subject matter of the present invention, and so no further details are given here. The belt photoreceptor 3 is an endless flexible belt having a photosensitive surface. In the arrangement shown, when the cassette 1 is removed from the main assembly of the copier, the belt is only loosely retained in the cassette, but when the cassette is inserted into the main assembly of the copying machine, the photoreceptor belt is supported in an operative position by members forming part of the main assembly. A cassette having this kind of loosely retained photoreceptor arrangement is described in our EP-A-0 244 104.

The development device 4 inclues a developer roll 8 which is arranged for rotation around a stationary, part-cylindrical, magnetic member 9, as well as two counter-rotating augers 10 and 11. These three rotating members are contained within a developer housing the lower wall 12 of which also forms part of the cassette housing 2, and the upper wall 13 of which is a metal extrusion which includes retaining features and a ridge-shaped protrusion 14 adjacent the developer roll 8 (see also FIG. 2). The protrusion 14 acts as a trim bar for developer material being carried (counter-clockwise, as viewed in FIG. 1) by the developer roll 8 towards the photoreceptor belt 3 at development station 15.

The end wall of the developer housing, which forms the rear wall of the housing when the cassette is inserted into the copier, is provided by a plastics molding 16 (FIG. 2). The molding 16 includes many suitably shaped protrusions, lips and recesses to enable it to be secured in place, and to provide seals and support surfaces for the other portions of the cassette and the development device with which it cooperates. The molding 16 provides a support for the drive shaft 17 of the developer roll, as will be described below.

The developer roll 8 comprises a cylindrical tubular part with an integral end cap (not shown) at its front end. The rear end 18 is open, as shown, and receives a press fitted end cap 19 which is formed integrally with drive shaft 17 to enable the roll 8 to be mounted for rotation about its axis. The front end cap is provided with a suitable boss for supporting the developer roll on a spindle (not shown). The multi-pole magnetic member 9, which is of generally cylindrical shape, is mounted within the developer roll. The outside surface of the roll 8 is provided with a series of axially extending ridges and valleys.

The drive shaft 17 of developer roll 8 is supported for rotation in molding 16 by means of bearing 20. The bearing 20 comprises a sleeve portion 21 and a flange portion 22 at one end of the sleeve portion. A lateral extension 23 of the flange 22 is provided to enable electrical connection to the bearing 20. The bearing 20 is molded in one piece from a conductive plastic material. The internal surface of the sleeve portion 21 provides a bearing surface for the metallic shaft 17, and establishes an electrical connection via the shaft to the developer roll 8. A suitable material for the bearing is a thermoplastic material such as Nylon or Acetal, filled with a conductive material such as graphite, carbon fibres, or metal fibres or flakes. A sealing collar 24 is located in a circular recess 25 in the flange portion 22, and is of U-shaped cross section so as to be somewhat resilient and form a tight sliding fit around the shaft 17.

The outer surface of the sleeve portion 21 of the bearing 20 fits into a cylindrical hole 25 in the molding 16. A spacing and locating member 26 accommodates the bearing 20, and positively prevents the bearing from rotating by means of a shaped recess 27 which receives the extension 23 of flange 22.

When all the parts shown in FIG. 2 are assembled, the splined end 28 of shaft 17 projects to the rear of molding 16, and couples with a drive shaft (not shown) which rotates the developer roll at the required speed.

The rear end of the upper wall 13 of the development device is located and retained by the shaped features of the molding 16. The rearmost part of the protrusion 14 tightly engages the edge of the extension 23 of bearing 20, thereby establishing electrical contact with it, and enabling the bearing to be maintained at the same potential as the upper wall 13.

I claim:

1. Developer apparatus for an electrostatographic apparatus, said apparatus comprising:
    a metallic developer roll forming a part of a magnetic brush system; and
    a bearing member for rotatably supporting said metallic developer roll, said bearing member including a cylindrical sleeve having an internal bearing surface and being fabricated from conductive plastic material.

2. Developer apparatus according to claim 1 including a metallic trim bar adjacent the developer roll for trimming a magnetic brush formed on the developer roll and wherein sad bearing has an extended portion thereof engaging said trim bar for establishing an electrical connection therewith.

* * * * *